A. P. HOLDEN.
CUTTER OR MILLER FOR THREAD CUTTING OR MILLING MACHINES.
APPLICATION FILED APR. 28, 1916.

1,237,516.

Patented Aug. 21, 1917.

Inventor
Archer P. Holden
per Chas. H. Riches
attorney

UNITED STATES PATENT OFFICE.

ARTHUR P. HOLDEN, OF TORONTO, ONTARIO, CANADA.

CUTTER OR MILLER FOR THREAD-CUTTING OR MILLING MACHINES.

1,237,516.  Specification of Letters Patent.  Patented Aug. 21, 1917.

Application filed April 28, 1916. Serial No. 94,176.

*To all whom it may concern:*

Be it known that I, ARTHUR PEART HOLDEN, of the city of Toronto, in the county of York and Province of Ontario, and Dominion of Canada, have invented certain new and useful Improvements in Cutters or Millers for Thread-Cutting or Milling Machines; and I hereby declare that the following is a full, clear, and exact description of the same.

This invention relates to a cutter or mill for thread cutting or milling machines, and comprises a cylindrical body, to one side face of which is secured a set of annularly-arranged dies having chasers on their inner faces concentric with the axis of the revolution of the cutter, these dies being arranged with radial separations between them, the object of the invention being to devise a cutter which can be employed for milling a thread on a variety of sizes of work ranging upwardly from zero to approximately the inner diameter of the dies, this object being attainable by the construction hereinafter described.

In the drawings:—

Like characters of reference refer to like parts throughout the specification and drawings.

Figures 1, 2, 3:
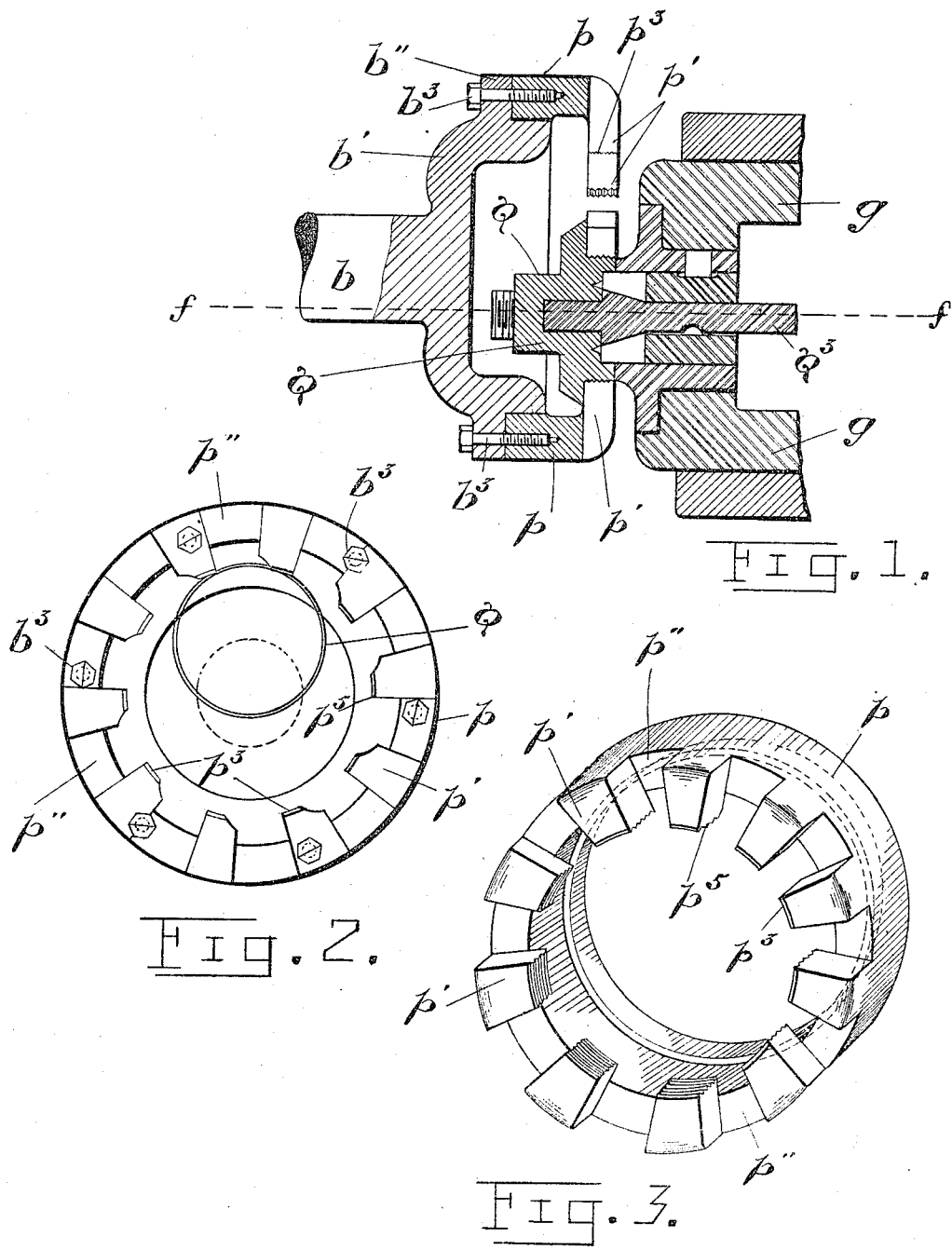
Figure 1, is a fragmentary section of a thread cutter, chuck and work.
Fig. 2, is an end elevation of the thread cutter shown in Fig. 1.
Fig. 3, is a perspective view of the cylindrical body and the dies of the thread cutter shown in the preceding views.

The end of the spindle $b$ adjacent to the chuck $q$ is formed or provided with a substantially-cup-shaped head $b'$ having a peripheral flange $b''$, through which are inserted bolts $b^3$ by which the cutter is secured to the spindle head.

The cutter consists of a cylindrical body or collet $p$ having a set of annularly-arranged dies $p'$ projecting from one of its side faces, with radial separations $p''$ between them for the cooling of the dies and the clearing of the cuttings when the mill is working, the cutting faces of the dies $p'$ having chasers $p^3$ for milling the thread in the work.

The chasers $p^3$ on the inner surface of each die are of constant inclination, pitch and depth, with corresponding grooves between them, and extend from the cutting edge $p^5$ across the face to the opposite edge of the die. The chasers of all the dies are in correct annular alinement and the cutting edges thereof are concentric with the axis of the revolution of the cutter.

The cylindrical body $p$ is mounted on the rim of the head $b'$, with its inner surface snugly fitting the external surface of the rim, and is secured to the head $b'$ by bolts $b^3$ inserted through the peripheral flange $b''$ into the cylindrical body.

The dies $p'$ extend inwardly beyond the inner surface of the cylindrical body $p$ to permit of the work entering the body when the cutter is being adjusted to its initial or starting position.

The method of milling the thread is as follows: The work Q is mounted on the spindle $Q^3$, and the chuck is moved to its starting position. The cutter is then moved transversely of the axis $f$—$f$, see Fig. 1, until the chasers come into contact with the work. Motion is then imparted to the spindle $b$ and chuck to cause the revolution of the cutter and work.

As shown by arrows in Fig. 2, the work and cutter revolve in opposite directions, the work as it revolves, being fed lengthwise away from the dies.

A thread can be cut on work of various diameters, the greatest diameter of the work approximating that of the chasers, and the minimum diameter approximating zero. The greater the diameter of the work, the longer the chasers remain in contact with the thread, with the result that when the thread is cut, it will be entirely free from all cutter marks, the principle of the operation being, that the longer the cutter remains in contact with the work, the smoother the finish of the thread, this being of essential importance in the manufacture of gas plugs for high explosive shells, in which it is necessary to mill a thread entirely free from all cutter marks to obtain a perfect contact between the thread of the plug and the thread of the gas hole in the base of the shell, which the plug is intended to fit, and in the case of fuse boxes for the nose of the plug.

By means of a cutter of this character, it is possible to mill a perfect thread in any character of work with which the chasers can be brought into contact, and the thread cut by the chasers will not only be uniform in depth, pitch and conformation throughout its length, but will also be free of all cutter markings, this being impossible of attainment in the use of an ordinary die or external cutter, owing to the difficulty of correctly bringing the die to a starting position where the work is formed with overhanging shoulders.

It is also possible with a cutter such as described, to increase the production of milled threads, as the cutter and work can be revolved in opposite directions at a high rate of speed and the chaser of each die will be maintained for a relatively long period in contact with the work, this being explained by the fact that the transverse adjustment of the head $a$ brings the cutter into an eccentric position to the axis of the work and, where the work is greater than one-half the internal diameter of the dies, the chasers of two or more dies will be maintained continuously in contact with the thread, and the same cutter may be used for milling the thread on various sizes of work.

Having thus fully described the nature of my invention, what I claim as new and desire to secure by Letters Patent, is:—

1. A thread cutter comprising a collet and a set of dies on a side face of the collet having chasers concentric with the axis thereof.

2. A thread cutter comprising a cylindrical body, and a set of annularly-arranged dies projecting from the side face of said body, with a radial separation between each adjacent pair of said dies, said dies having chasers on their inner faces concentric with the axis of the cutter.

3. A thread cutter comprising a cylindrical body, a set of annularly-arranged dies projecting from the side face of said body, chasers on the inner faces of the dies concentric with the axis of the cutter, an arbor, and means for separably securing the cylindrical body to the arbor.

4. A thread cutter comprising a cylindrical body, a set of annularly-arranged dies projecting from the side face of said body, chasers on the inner faces of the dies concentric with the axis of the cutter, an arbor, and a disk for the arbor to which the cylindrical body is removably bolted.

5. A thread cutter comprising a cylindrical body, a set of dies secured to one side face thereof, having chasers arranged concentric with the axis of the revolution of the cutter, a spindle, a head for the spindle on which said cylindrical body is seated, a flange for said head, and bolts inserted through said flange into the cylindrical body to removably secure the cutter thereto.

6. A thread cutter comprising a cylindrical body and an annular set of separated thread-cutting dies on the side face thereof, each die having chasers of constant inclination, pitch and depth, with corresponding grooves between them, and a cutting edge at one extremity of the chasers, the cutting edges of the dies being in annular alinement and concentric with the axis of revolution.

Toronto, April 14th, 1916.

ARTHUR P. HOLDEN.

Signed in the presence of—
C. H. RICHES,
PHILIP MORGAN.